United States Patent [19]
Ataie et al.

[11] Patent Number: 5,858,265
[45] Date of Patent: Jan. 12, 1999

[54] HEXAFERRITE MATERIALS

[75] Inventors: Abolghasem Ataie, Tehran, Islamic Rep. of Iran; Ivor Rex Harris; Clive Brian Ponton, both of Birmingham, Great Britain

[73] Assignee: The University of Birmingham, Birmingham, Great Britain

[21] Appl. No.: 836,993

[22] PCT Filed: Nov. 24, 1995

[86] PCT No.: PCT/GB95/02758

§ 371 Date: Jul. 28, 1997

§ 102(e) Date: Jul. 28, 1997

[87] PCT Pub. No.: WO96/17343

PCT Pub. Date: Jun. 6, 1996

[30] Foreign Application Priority Data

Nov. 25, 1994 [GB] United Kingdom .................. 9423788

[51] Int. Cl.[6] .................................................. G11B 5/706
[52] U.S. Cl. .................................. 252/62.63; 252/62.55; 252/62.57; 264/613
[58] Field of Search ........................ 252/62.55, 62.57, 252/62.63; 264/613

[56] References Cited

U.S. PATENT DOCUMENTS 3,502,584  3/1970  Denes .................................. 252/62.55
4,699,840  10/1987 Yashiro et al. ....................... 252/62.55

FOREIGN PATENT DOCUMENTS

| 106577 | 4/1984 | European Pat. Off. . |
| 503639 | 9/1992 | European Pat. Off. . |
| 57-197808 | 12/1982 | Japan ................... 252/62.55 |
| 61-152003 | 7/1986 | Japan . |
| 64-10604 | 1/1989 | Japan ................... 252/62.63 |

OTHER PUBLICATIONS

Patent Abstracts of Japan; vol. 10, No. 352 for JP 61152003, Nov. 27, 1986.

*Primary Examiner*—Melissa Bonner
*Attorney, Agent, or Firm*—Trexler, Bushnell, Giangiorgi & Blackstone, Ltd.

[57] ABSTRACT

Barium, strontium and/or rare earth metal hexaferrite powder of low coercivity can be produced by subjecting a barium, strontium and/or rare earth metal hexaferrite powder to carburising, nitriding, carbonitriding, hydriding or carbohydriding conditions without undue loss of saturation magnetisation. High coercivity powder can be produced by calcining the low coercivity powder (FIG. 1). High remanence and high saturation magnetisation powder can be produced by mechanically alloying of a Sr—, Ba and/or rare earth metal hexaferrite powder with iron powder (FIG. 12).

9 Claims, 6 Drawing Sheets

HEXAFERRITE MATERIALS

BACKGROUND OF THE INVENTION

This invention relates to hexaferrite materials and is more particularly, though not exclusively, concerned with permanent magnet hexaferrite materials for high density recording media and permanent magnet applications.

DESCRIPTION OF THE BACKGROUND ART

The properties required of magnetic materials for high density recording media depends inter alia upon the type of recording media. For most recording media, high saturation magnetization, high structural and chemical stability and low cost are important criteria. In the case of recording media such as are used in hard disks, floppy disks, and video tapes, high coercivities should be avoided so as to facilitate re-recording. However, in recording media such as are used in identification cards and credit cards, high coercivity is required so as to reduce the risk of data becoming corrupted when such cards are exposed to stray magnetic fields. Also for fabrication of permanent magnets, high saturation magnetisation, sufficient coercivity and structural/chemical stability are the important criteria.

Barium hexaferrite ($BaFe_{12}O_{19}$) and strontium hexaferrite ($SrFe_{12}O_{19}$) in powder form have excellent chemical stability and are promising materials for perpendicular and longitudinal high density recording media. For increasing the suitability of hexaferrite powders for recording media such as hard disks, floppy disks and video tapes, it has been proposed to substitute Co—Ti, Co—Ni—Zn and Co—Zr for some of the iron in the hexaferrites in order to lower the coercivity somewhat. However, the saturation magnetization is also decreased markedly to an unacceptable extent. Conversely, in order to increase the coercivity to make these hexaferrites suitable for recording media in identification cards and credit cards or for the fabrication of permanent magnets, it has been previously proposed either to substitute the hexaferrites with elements such as aluminium and chromium or to produce the hexaferrites using chemical methods which are more expensive than conventional ceramic mixed oxide production methods. Increasing the amount of these substituting elements such as aluminium and chromium results in a significant and unacceptable decrease in the saturation magnetization.

DESCRIPTION OF THE INVENTION

It is an object of the present invention to provide a novel way of processing hexaferrites in order to produce the desired coercivity in a relatively economical manner without deleteriously affecting the saturation magnetization to an unacceptable extent, and in some cases actually increasing saturation magnetisation.

According to a first aspect of the present invention, barium, strontium and/or rare earth metal hexaferrite powders having suitably low coercivity for use in recording media such as hard disks, floppy disks and video tapes, can be prepared by heat treating barium, strontium and/or rare earth metal hexaferrite powder in the presence of carbon, nitrogen, carbon and nitrogen, hydrogen or carbon and hydrogen. Such heat treatment typically involves treatment of the hexaferrite powder under the conditions generally employed for carburising, nitriding, carbonitriding, hydriding or carbohydriding, as the case may be. Thus, for convenience, the respective heat treatments will be referred to hereinafter as "carburising", "nitriding", "carbonitriding", "hydriding" or and "carbohydriding".

The resultant treated powder has a suitably low coercivity (not more than about 1 kOe) for use as recording media in hard disks, floppy disks and video tapes.

In order to produce powders of higher coercivity, such treated powders can be calcined to recover the ferrite structure. Surprisingly, it has been found that carburising, nitriding, carbonitriding, hydriding and carbohydriding are reversible reactions, and that the hexaferrite powders thus treated have a relatively low coercivity without the saturation magnetization being deleteriously affected to an unacceptable extent for use as recording media in hard disks, floppy disks and video tapes. The subsequent calcining operation increases the coercivity without the need either to employ an expensive chemical method or to introduce such substituting elements as aluminium and chromium which decrease the saturation magnetization significantly.

The hexaferrite powders may be synthesized in any desired way, for example by a conventional mixed oxide production method, a hydrothermal production method or a co-precipitation production method.

The mixed oxide route involves calcination of a mixture of barium, strontium or rare earth oxide with $\alpha$-$Fe_2O_3$, typically at a temperature of about 1200° C., and is relatively inexpensive.

The hydrothermal route generally results in a purer product than the mixed oxide route and involves (a) the aqueous phase reaction of barium, strontium or rare earth metal nitrate with hydrated ferric nitrate in the presence of a suitable base such as NaOH or KOH, or (b) the aqueous phase reaction of barium, strontium or rare earth metal hydroxide with $\alpha$-$Fe_2O_3$ or ferric chloride in the presence of a suitable base such as NaOH or KOH, the reaction being effected in an autoclave at a relatively low temperature (about 200° to 300° C.).

The coprecipitation process takes place when all of the cations are obtained from an aqueous solution. Metal salts (e.g. nitrates, acetates, oxalates) and $NaOH/Na_2CO_3$ are used as starting materials and precipitant, respectively. The coprecipitated phases from an aqueous solution of iron and barium or strontium compounds must currently be calcined at about 850° C. Ultrafine, chemically homogenous, uniform size particles hexaferrite powders can be produced by this method.

The treated hexaferrite material is believed to be a per se novel material. Thus, according to a second aspect of the present invention, there is provided a carburised, nitrided, carbonitrided, hydrided or carbohydrided barium, strontium and/or rare earth metal hexaferrite.

In the present invention, it is believed that, among the rare earth metals, suitable ones can be found, particularly within the group lanthanum, praesodymium, neodymium, samarium, europium, dysprosium and terbium.

The hexaferrite powders may be carburised by solid substances (granular compounds such as charcoal) or gas carburising (static or flowing) using hydrocarbons such as $CH_4$ under various pressures. Regardless of which method is used, carburisation always takes place via a gaseous phase. The carburisation temperature and time can be selected as required from those generally used for carburisation, but typically the temperature is in the range of 750° to 950° C., and the time is in the range of 1 to 5 hours.

Nitriding (sometimes also called "nitrogenation" herein) may be effected by both static or flowing $N_2$ gas (1 bar), $N_2$ gas (>1 bar), $N_2$—$H_2$ mixed gas, $NH_3$ gas and $NH_3$—$H_2$ mixed gas. Powder nitriding (packed nitriding) may be also used to nitride hexaferrite powders. The nitriding pressure, temperature and time can be selected as required from those generally used for nitriding, but typically the pressure is in the range of 0.2 to 1.5 bar, the temperature is in the range of 500° to 900° C., and the time is in the range of 1 to 10 hours.

Carbonitriding may be effected by a mixture of $NH_3$ and hydrocarbons (usually in the form of pure propane or endogas produced from propane and air) in a gaseous atmosphere (static or flowing). The carbonitriding temperature and time can be selected as required from those used for carbonitriding and which are generally similar to those used for carburising.

Hydriding (sometimes called "hydrogenation" herein) may be effected by $H_2$ gas (static or flowing) under various pressures. The hydriding pressure, temperature and time can be selected as required from those generally used for hydriding, but typically the pressure is at least about 0.2 bar (more preferably at least about 0.3 bar and most preferably about 0.3 to about 1.3 bar), the temperature is in the range of 600° to 850° C., and the time is in the range of 1 to 10 hours.

Carbohydriding may be effected by $CH_4$ gas (static or flowing) under various pressures. The carbohydriding temperature and time can be selected as required from those used for carbohydriding and which are generally similar to those used for carburising.

From X-ray diffraction (XRD) data on carburized strontium hexaferrite barium, it is believed that magnetisation is due to the presence of free particles of Fe which coexist with the hexaferrite. Accordingly, the present invention further resides in a mixed crystal structure comprising Fe particles in admixture with particles of barium, strontium and/or rare earth metal hexaferrite, and in the use thereof in a magnetic material.

Apart from producing such a mixed crystal structure by treating particles of barium, strontium and/or rare earth metal hexaferrite in the above described manner, the structure can also be produced simply by a mechanical alloying technique such as by milling particles of free Fe with particles of barium, strontium and/or rare earth metal hexaferrite using wet or dry milling or a combination of wet and dry milling. Such a procedure can result in the production of particles which not only possess enhanced magnetic properties, but also magnetic anisotropy.

BRIEF DESCRIPTION OF THE DRAWINGS

Of the following 12 Figures, all refer to isotropic magnetic property data except for FIGS. 7, 10 11 and 12.

DETAILED DESCRIPTION OF THE INVENTION

The present invention will now be described in more detail in the following Examples.

EXAMPLE 1

Strontium hexaferrite powder was synthesized hydrothermally from precursors in the presence of NaOH at 220° C. for 1 h with a OH—/$NO_3$— molar ratio of 2 without stirring. The resulting strontium hexaferrite powder had a plate-like shape, a coercivity of 1.15 kOe, a remanence of 20 emu/g, a saturation magnetization of 50.4 emu/g and a Curie point of 450° C.

The thus-synthesized strontium hexaferrite powder was nitrided in a static $N_2$ gas (1 bar) in resistance heated vacuum tube furnace at 800° C. for 4 hours with heating and cooling rates of 3° C./min. The resulting nitrided strontium hexaferrite powder had a coercivity of 0.37 kOe, a remanence of 32.6 kOe, a saturation magnetization of 68.1 emu/g and a Curie point of about 300° C. As can be seen from these results, the nitrided strontium hexaferrite powder has enhanced remanence and saturation magnetization with a lower coercivity, thus making it potentially suitable for use in recording media such as hard disks, floppy disks and video tapes.

A sample of the nitrided hexaferrite powder was calcined at 1100° C. for 75 min in air using a resistance heated muffle furnace. The resulting calcined powder had a tablet-like shape (the aspect ratio, diameter/thickness is decreased significantly), a coercivity as high as 4.74 kOe, a remanence of 31.8 emu/g, a saturation magnetization of 55.5 emu/g, and a Curie point of 450° C., thus making the material potentially suitable for use as a recording medium in identification cards and credit cards and for the fabrication of permanent magnets.

EXAMPLE 2

Strontium hexaferrite powder, synthesized by a conventional ceramic mixed oxide route and as supplied by Swift Levick Magnets Ltd, had a coercivity of 2.78 kOe, a remanence of 40 emu/g, a saturation magnetization of 69.1 emu/g and a Curie point of 450° C.

This strontium hexaferrite powder was carburized by granular charcoal (sized from 2 to 5 mm) in a ceramic crucible sealed by alumina-silica clay in a resistance heated muffle furnace at 850° C. for 2 hours with heating/cooling rates of 5° C./min. The hexaferrite powder was separated from charcoal granules by a stainless steel net.

The resulting carburised strontium hexaferrite powder had a coercivity of 0.36 kOe, a remanence of 20 emu/g, a saturation magnetization of 107.3 emu/g and a Curie point of higher than 500° C. From the XRD results, it is believed that the high magnetisation of this sample is due to presence of free Fe particles which coexist with hexaferrite particles. As can be seen from these results, the carburised strontium hexaferrite powder has enhanced remanence and saturation magnetization with a lower coercivity, thus making it potentially suitable for use in recording media such as hard disks, floppy disks and video tapes.

A sample of the carburised hexaferrite powder was calcined at 1000° C. for 2 hours in a resistance heated muffle furnace. The resulting calcined powder had a coercivity as high as 4.36 kOe, a remanence of 33.6 emu/g, a saturation magnetization of 60 emu/g and a Curie point of 450° C., thus making the material potentially suitable for use as a recording medium in identification cards and credit-cards and for fabrication of permanent magnets.

EXAMPLE 3

Strontium hexaferrite powder, synthesised by a ceramic mixed oxide route and as supplied by Swift Levick Magnets Ltd, had a coercivity of 2.78 kOe, a remanence of 40 emu/g and a saturation magnetisation of 69.1 emu/g. This strontium hexaferrite powder was nitrided in a static $N_2$ atmosphere (1 bar) at 800° C. for 4 h with a heating/cooling rates of 3° C./min in a resistance vacuum tube furnace.

The resulting nitrided strontium hexaferrite powder had a coercivity of 0.741 kOe, a remanence of 30 emu/g and a saturation magnetisation of 67.3 emu/g. As can be seen from these results, the nitrided strontium hexaferrite powder had a lower coercivity, thus making it potentially suitable for use in recording media such a hard disk, floppy disk and video tapes.

A sample of the nitrided hexaferrite powder was calcined in 1100° C. for 75 min. in air. The resultant calcined powder had a coercivity of 3.9 kOe, a remanence of 34.7 emu/g and a saturation magnetisation of 59.5 emu/g, thus making it potentially suitable for use as a recording medium in identification cards and credit cards and for the fabrication of permanent magnets.

EXAMPLE 4

Strontium hexaferrite powder was synthesised hydrothermally from nitrate precursors in the presence of NaOH at 220° C. for 1 h with an $OH^-/NO_3^-$ molar ratio of 2 without stirring. The resulting strontium hexaferrite powder had a coercivity of 1.15 kOe, a remanence of 20 emu/g and a saturation magnetisation of 50.4 emu/g.

The thus-synthesised strontium hexaferrite powder was carburised by granular charcoal (sized from 2 to 5 mm) in a ceramic crucible sealed by alumina-silica clay in a resistance heated muffle furnace at 850° C. for 2 hours with heating/cooling rates of 5° C./min. The hexaferrite powder was separated from charcoal granules by a stainless steel net.

The resulting carburised strontium hexaferrite powder had a coercivity of 0.34 kOe, a remanence of 15.4 emu/g and a saturation magnetisation of 125.9 emu/g.

As can be seen from these results, the carburised strontium hexaferrite powder had enhanced remanence and saturation magnetisation with a lower coercivity, thus making it potentially suitable for use in recording media such as hard disks, floppy disks and video tapes.

EXAMPLE 5

Figure 1:
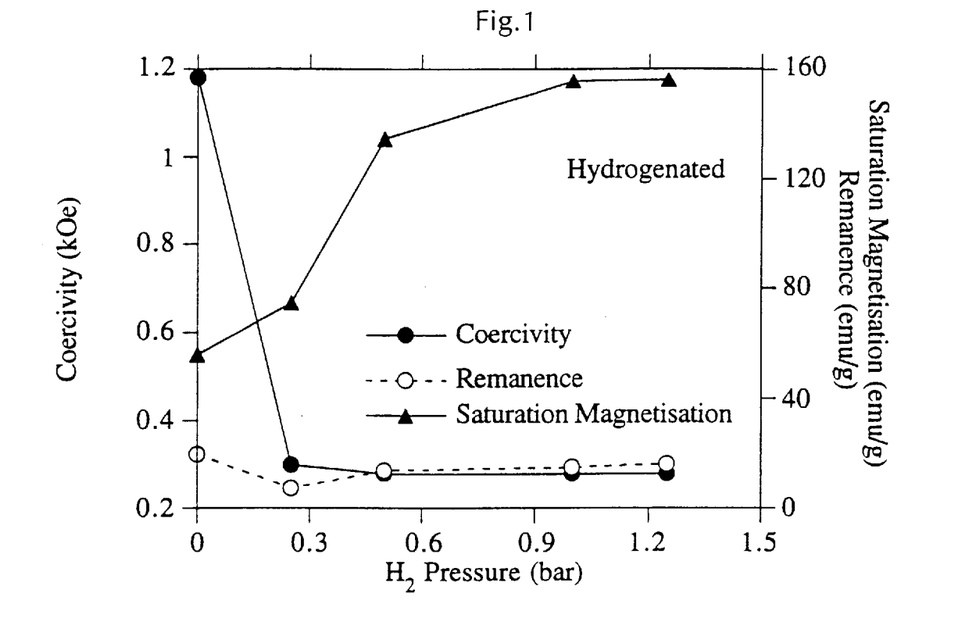
FIG. 1 is a graph showing the variation in magnetic properties with hydrogen pressure for samples of hydrogenated strontium hexaferrite.

Samples of hydrothermally produced strontium hexaferrite having a coercivity of 1.2 kOe, a remanence of 20 emu/g and a saturation magnetization of 56 emu/g, were hydrogenated at 850° C. for one hour under hydrogen pressures as indicated in FIG. 1. As can be seen from FIG. 1, coercivity decreased significantly after hydrogenation under a hydrogen pressure of 0.25 and any further increase in hydrogen pressure had a negligible effect on the coercivity. In contrast, the saturation magnetization increased significantly from an initial value 56 emg/g before hydrogenation to 156 emu/g after hydrogenation using a hydrogen pressure of 1.25 bar. The remanence does not change markedly as a function of hydrogenation. The decrease in the coercivity and the increase in saturation magnetization is attributed to the reduction in scale of the strontium hexaferrite microstructure and the formation of free iron.

Figure 2:
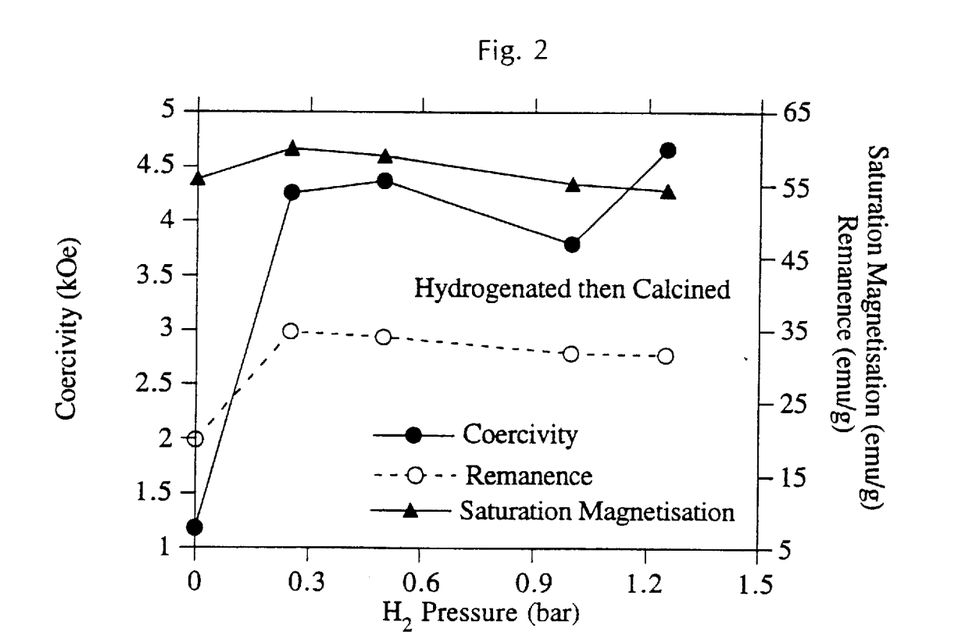
FIG. 2 is a graph for showing the variation in magnetic properties with hydrogen pressure for hydrogenated and then calcined strontium hexaferrite.

When these hydrogenated samples were calcined at 1000° C. for two hours, the hexaferrite crystal structure was recovered (showing a reversible transformation reaction). However, the coercivity of the hydrogenated and calcined samples increased significantly ( by more than 300%) in comparison with the non-hydrogenated sample. These results are shown in enclosed FIG. 2. This significant increase in coercivity is believed to be as a result of the smaller mean particle size of the newly nucleated strontium hexaferrite. The remanence and saturation magnetization of the hydrogenated and calcined samples did not change significantly. These hydrogenated and calcined samples are believed to consist of single domain particles of strontium hexaferrite.

Figure 3:
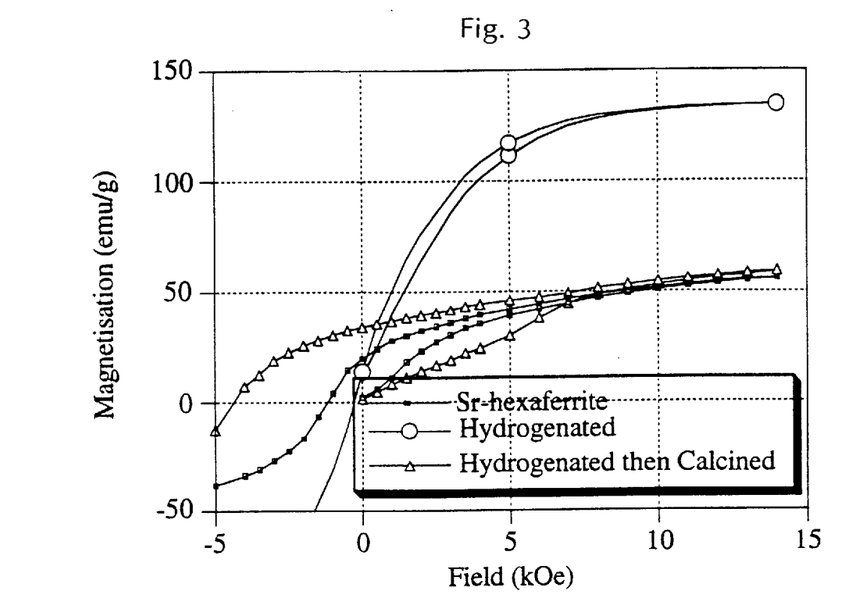
FIG. 3 is a graph showing magnetisation curves for the strontium hexaferrite before hydrogenation, after hydrogenation and after hydrogenation and calcination.
Figure 4:
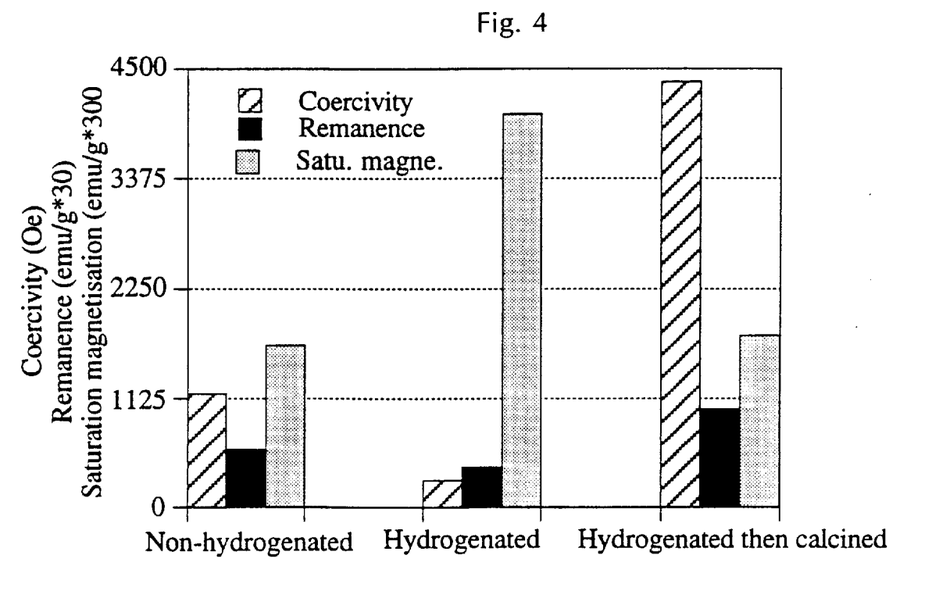
FIG. 4 is a bar chart showing the coercivity, remanence and saturation magnetisation properties of the strontium hexaferrite before hydrogenation, after hydrogenation, and after hydrogenation and calcination.

The shape of the initial magnetization curve in FIG. 3 supports this. The the coercivity, remanence and saturation magnetisation properties of the samples of strontium hexaferrite before hydrogenation, after hydrogenation, and after hydrogenation and calcination are shown if FIG. 4.

EXAMPLE 6

In this example, strontium hexaferrite powder which had been synthesized hydrothermally and strontium hexaferrite powder which had been synthesized by a conventional ceramic mixed oxide route (Commercial Sr-hexaferrite) were used . The hydrothermally produced strontium hexaferrite had a coercivity of 1.2 kOe, a remanence of 20 emu/g and a saturation magnetization of 56 emu/g, whilst the Commercial Sr-hexaferrite had a coercivity of 2.77 kOe, a remanence of 40 emu/g and a saturation magnetization of 69 emu/g. Samples of the above strontium hexaferrite powders were subjected to nitrogenation and post-nitrogenation calcination under the conditions listed in Table 1 below:

TABLE 1

| Sample Number | Material | Treatment | Treatment Conditions: Temperature (°C.) Time (min) Pressure (bar) | Calcination Conditions: Temperature (°C.) Time (min) |
|---|---|---|---|---|
| 1 | Commercial Sr-hexaferrite | Nitrogenation | 500 180 1 | 850 1 |
| 2 | Commercial Sr-hexaferrite | Nitrogenation | 800 240 1 | 850 120 |
| 3 | Commercial Sr-hexaferrite | Nitrogenation | 800 240 1 | 1000 75 |
| 4 | Commercial Sr-hexaferrite | Nitrogenation | 800 240 1 | 1000 120 |
| 5 | Commercial Sr-hexaferrite | Nitrogenation | 800 240 1 | 1100 75 |
| 6 | Commercial Sr-hexaferrite | Nitrogenation | 800 240 1 | 1250 60 |
| 7 | Hydrothermally produced strontium hexaferrite | Nitrogenation | 500 180 1 | 850 120 |
| 8 | Hydrothermally produced strontium hexaferrite | Nitrogenation | 800 240 1 | 850 120 |
| 10 | Hydrothermally produced strontium hexaferrite | Nitrogenation | 800 240 1 | 1000 75 |
| 11 | Hydrothermally produced strontium hexaferrite | Nitrogenation | 800 240 1 | 1100 75 |

Analysis of data obtained indicates that nitrogenation takes place in a similar manner to hydrogenation, but results in magnetic properties of different magnitudes (the coercivity and saturation magnetization are changed in a similar way). The coercivity of the nitrogenated samples decreased, whilst the saturation magnetization increased and the remanence decreased slightly. It is believed that the in-situ formation of soft magnetic phases such as $Fe_3O_4$ may be responsible for such changes.

Figure 5:
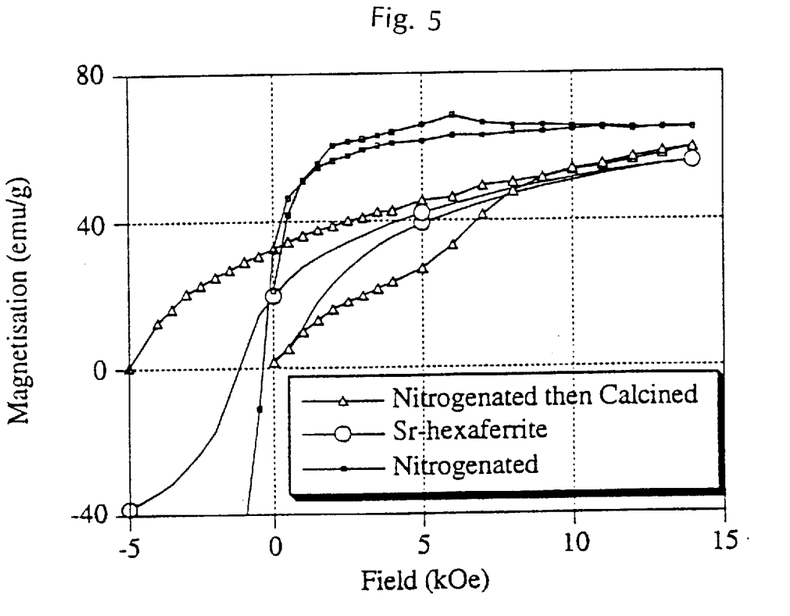
FIG. 5 is a graph showing magnetisation curves versus applied field for samples of strontium hexaferrite before nitrogenation, after nitrogenation, and after nitrogenation and calcination.

Examination of Sample Number 10 by scanning electron microscope shows that the original hydrothermally-produced strontium hexaferrite powder before nitrogenation consisted of plate-like particles having an average particle size of 1.5 $\mu$m, whilst the mean particle size of the nitrogenated and calcined material was significantly smaller than this (less than 0.5 $\mu$m) and the particles were of tablet-like shape. The decrease in the aspect ratio of the particles may be attributed to the change in the lattice parameters. It is believed that, after these nitrogenation and calcination treatments, single domain particles of strontium hexaferrite may be obtained. This is supported by the shape of the initial magnetization curve in enclosed FIG. 5 where the nitrogenated and calcined material exhibited very low susceptibility in comparison with the non-nitrogenated original material.

Figure 6:
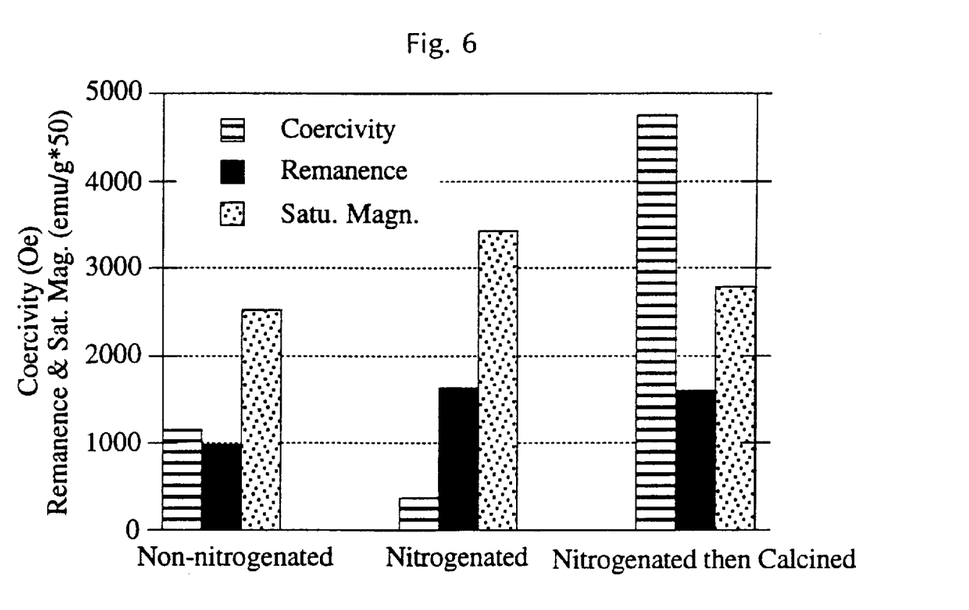
FIG. 6 is a bar chart showing the coercivity, remanence and saturation magnetisation properties of the strontium hexaferrite before nitrogenation, after nitrogenation, and after nitrogenation and calcination.

The magnetic property values of the original powder in comparison with the corresponding values after nitrogenation and post-nitrogenation calcination for Sample Number 10 are shown in enclosed FIG. 6.

Figure 7:
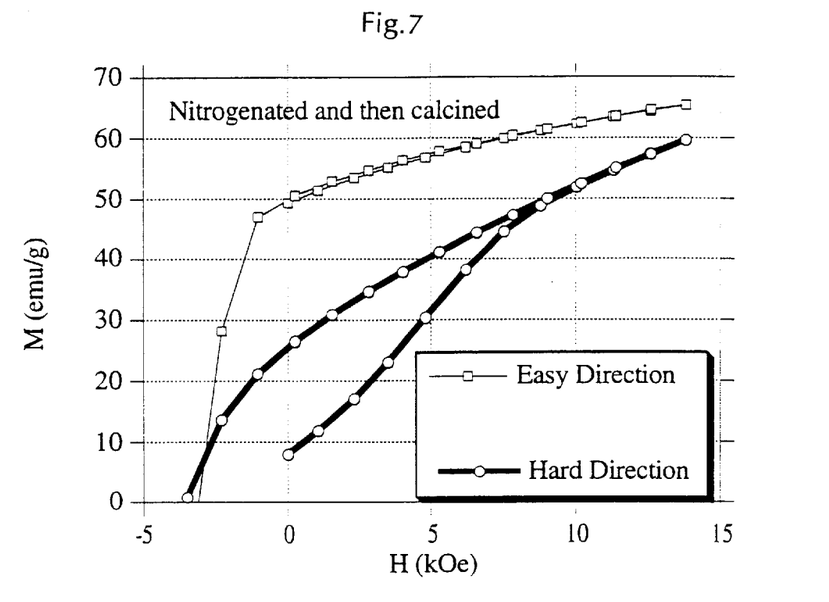
FIG. 7 is a graph showing the anisotropic nature of the nitrogenated and calcined sample.

X-ray diffraction data on Sample Number 4 shows that post-nitrogenation calcination recovers the hexaferrite structure. The lattice parameters of the nitrogenated and calcined material in respect of Sample Number 4 were different to those of the non-nitrogenated material, exhibiting about 0.1% contraction along the a-axis and about 0.3% expansion along the c-axis. Sample Number 4 exhibited a good anistropic nature as shown in FIG. 7.

EXAMPLE 7

Hydrothermally-produced and commercial mixed oxide route-produced strontium hexaferrite powders having the magnetic properties indicated in Example 6 above were carburised and then calcined under the respective treatment conditions shown in Table 2 below.

Figure 8:
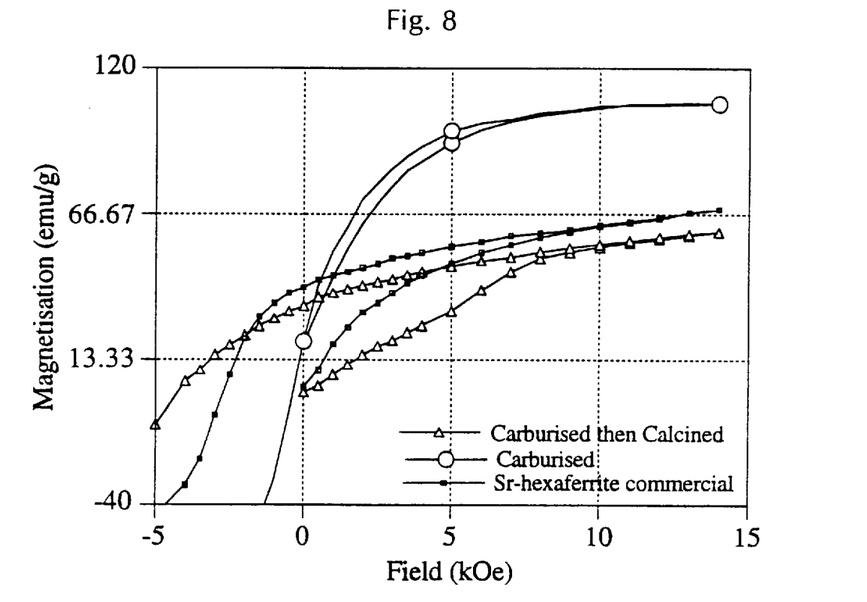
FIG. 8 is a graph showing magnetisation curves versus applied field for samples of strontium hexaferrite before carburisation, after carburisation, and after carburisation and calcination.

Enclosed FIG. 8 shows the magnetization curves for Sample Number 3 of Table 2 below.

Figure 9:
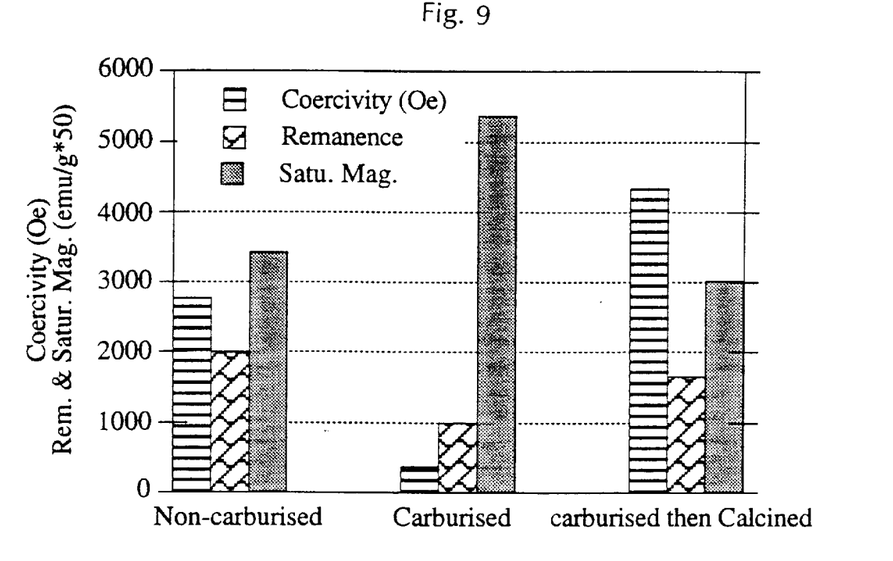
FIG. 9 is a bar chart showing the coercivity, remanence and saturation magnetisation properties of the strontium hexaferrite before carburisation, after carburisation, and after carburisation and calcination.

The magnetic properties for the non-carburised, carburised, and carburised and calcined strontium hexaferrite material corresponding to Sample Number 3 of Table 2 below are shown in FIG. 9 where it will be seen that the coercivity of the commercial hexaferrite powder decreased from 2770 Oe to 370 Oe when it was carburised at 850° C. for two hours, whilst the saturation magnetization increased from 69 emu/g to 107 emu/g. These magnetic properties changed to 4340 Oe and 60 emu/g, respectively, after the carburised sample had been calcined at 1000° C. for two hours. Reduction of the hexaferrite structure and the formation of free iron during carburising and the re-nucleation of fine particles of strontium hexaferrite during the post-carburising calcination are believed to be responsible for these changes in the magnetic properties.

Powder X-ray diffraction patterns indicate that the carburising process, like hydrogenation and nitrogenation, is a reversible process. The lattice parameters of the carburised and calcined samples are different to those of the non-carburised samples, however, exhibiting a contraction along the a-axis and expansion along the c-axis.

TABLE 2

| Sample Number | Material | Treatment | Treatment Conditions: Temperature (°C.) Time (min) | Calcination Conditions: Temperature (°C.) Time (min) |
|---|---|---|---|---|
| 1 | Commercial Sr-hexaferrite | Carburising | 850 90 | 1000 120 |
| 2 | Commercial Sr-hexaferrite | Carburising | 850 120 | 800 45 |
| 3 | Commercial Sr-hexaferrite | Carburising | 850 120 | 1000 120 |
| 4 | Commercial Sr-hexaferrite | Carburising | 850 120 | 1250 60 |
| 5 | Hydrothermally produced Sr-hexaferrite | Carburising | 850 120 | 800 45 |
| 6 | Hydrothermally produced Sr-hexaferrite | Carburising | 850 120 | 850 60 |

EXAMPLE 8

In this example, various starting materials indicated in Table 3 below were subjected to mechanical alloying by milling for the time indicated in Table 3. In Table 3, the reduced strontium hexaferrite corresponds to a hexaferrite produced hydrothermally followed by reduction using hydrogen. Such sample had a coercivity of 277 Oe, a remanence of 15 emu/g and a saturation magnetization of 156 emu/g. The iron powder was a commercially available iron powder having a coercivity of 284 Oe, a remanence of 18 emu/g and a saturation magnetization of 215 emu/g. The milled iron powder had a coercivity of 300 Oe, a remanence of 29 emu/g and a saturation magnetization of 203 emu/g. The conventionally produced strontium hexaferrite had a coercivity of 4.1 kOe, a remanence of 39 emu/g and a saturation magnetization of 65 emuig, whilst the conventionally produced barium hexaferrite had a coercivity of 3.9 kOe, a remanence of 36 emu/g and a saturation magnetization of 64 emu/g.

Figure 10:
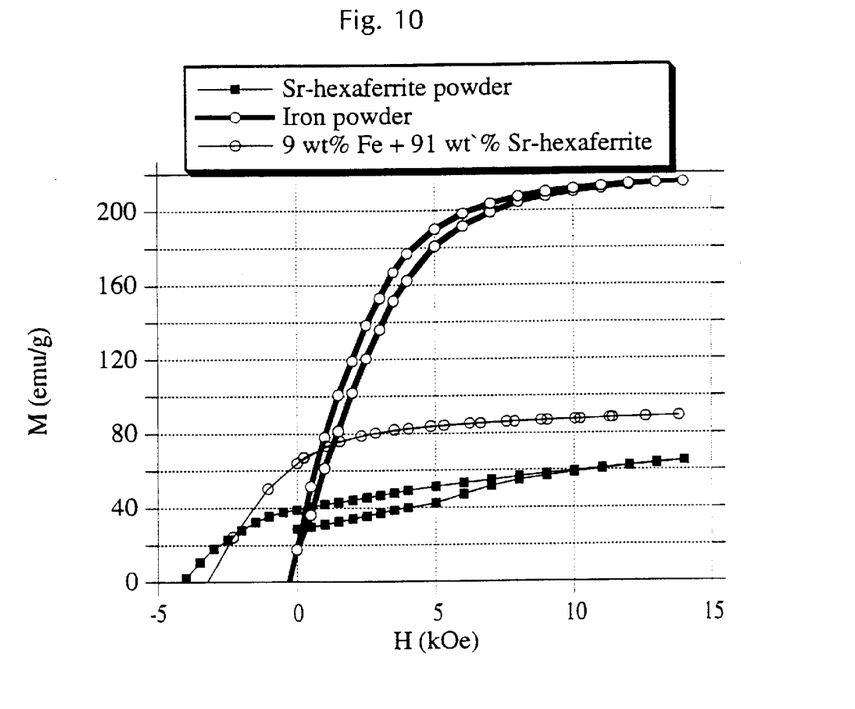
FIG. 10 is a graph showing magnetisation curves versus applied field for samples of commercial iron powder, strontium hexaferrite, and a composite material comprising 9 wt % iron and 91 wt % strontium hexaferrite formed by milling the iron powder and the strontium hexaferrite.
Figure 11:
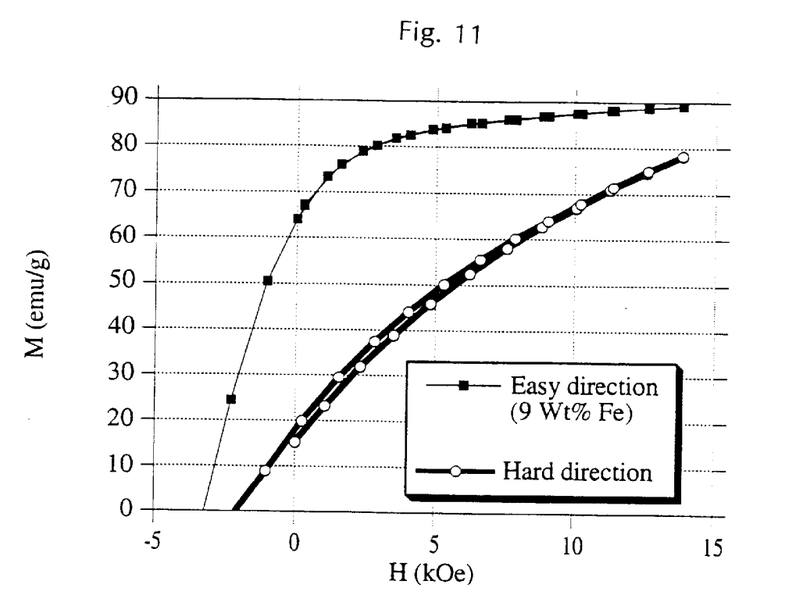
FIG. 11 is a graph showing the anisotropic nature of the sample of composite material comprising 9 wt % iron and 91 wt % strontium hexaferrite formed by milling the iron powder and the strontium hexaferrite.
Figure 12:
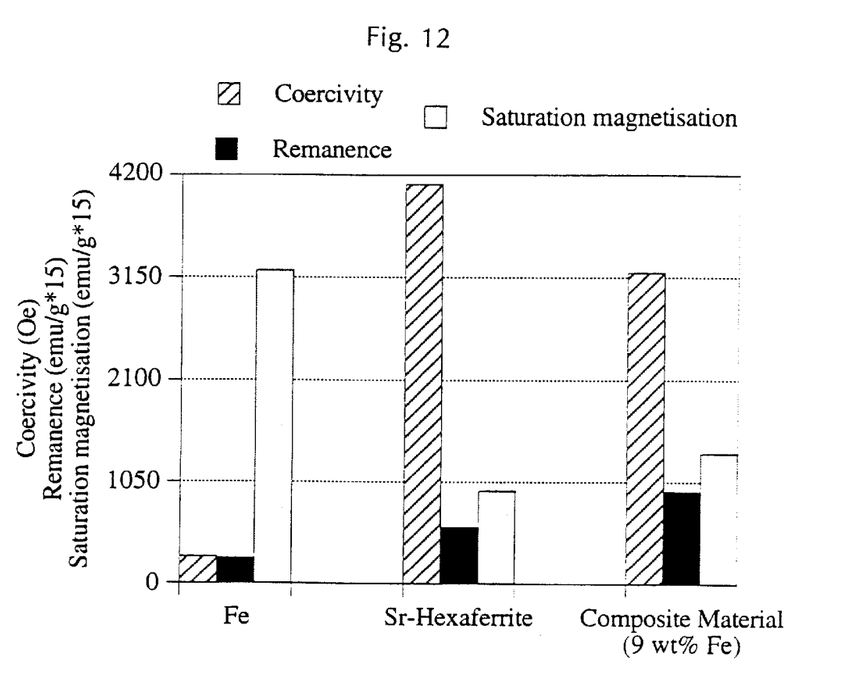
FIG. 12 is a bar chart showing the coercivity, remanence and saturation magnetisation properties of the commercial iron powder, strontium hexaferrite, and a composite material comprising 9 wt % iron and 91 wt % strontium hexaferrite formed by milling the iron powder and the strontium hexaferrite.

Milling was effected in a ball mill, using ethanol when wet milling. The magnetisation curves for Sample Number 17 of the starting materials and the mechanically alloyed composite material are illustrated in enclosed FIG. 10, whilst the anisotropic behaviour and the magnetic properties for the same sample are illustrated, respectively, in FIGS. 11 and 12.

TABLE 3

| Sample Number | Materials | Wt % of Fe | Milling Time (h) |
|---|---|---|---|
| 1 | Reduced Sr-hexaferrite and conventionally produced Sr-hexaferrite | 33 | 0 |
| 2 | Reduced Sr-hexaferrite and conventionally produced Sr-hexaferrite | 22 | 1 |
| 3 | Fe and conventionally produced Sr-hexaferrite | 33 | 1 |
| 4 | Fe and conventionally produced Sr-hexaferrite | 17 | 1 |
| 5 | Fe and conventionally produced Sr-hexaferrite | 17 | 16 |
| 6 | Fe and conventionally produced Sr-hexaferrite | 9 | 1 |
| 7 | Fe and conventionally produced Sr-hexaferrite | 9 | 16 |
| 8 | Fe (milled for 24 h) and conventionally produced Sr-hexaferrite | 25 | 1 |
| 9 | Fe (milled for 24 h) and conventionally produced Sr-hexaferrite | 25 | 6 |
| 10 | Fe (milled for 24 h) and conventionally produced Sr-hexaferrite | 25 | 30 |
| 11 | Fe and conventionally produced Ba-hexaferrite | 33 | 1 |
| 12 | Fe and conventionally produced Ba-hexaferrite | 33 | 4 |
| 13 | Fe and conventionally produced Ba-hexaferrite | 33 | 7 |
| 14 | Fe and conventionally produced Ba-hexaferrite | 33 | 24 |
| 15 | Fe and conventionally produced Ba-hexaferrite | 33 | 24 wet and 9 dry |
| 16 | Fe and conventionally produced Sr-hexaferrite | 6.5 | 1 wet |
| 17 | Fe and conventionally produced Sr-hexaferrite | 9 | 1 wet |
| 18 | Fe and conventionally produced Sr-hexaferrite | 14 | 1 wet |

I claim:

1. A method of producing a hexaferrite powder having high coercivity, said hexaferrite powder selected from barium hexaferrite powder, strontium hexaferrite powder and rare earth metal hexaferrite powder, comprising:

a) heat treating one of a barium hexaferrite powder, strontium hexaferrite powder and rare earth metal hexaferrite powder under one of the following conditions:
      (i) carburising conditions in a gaseous atmosphere containing carbon:
      (ii) nitriding conditions in a gaseous atmosphere containing nitrogen;
      (iii) carbonitriding conditions in a gaseous atmosphere containing carbon and nitrogen:
      (iv) hydriding conditions in a gaseous atmosphere containing hydrogen:
      (v) carbohydriding conditions in a gaseous atmosphere containing carbon and hydrogen: and
   b) calcining the resultant powder.

2. A method as claimed in claim 1, wherein the rare earth metal is selected from lanthanum, praseodymium, neodymium, samarium, europium, dysprosium and terbium.

3. A method as claimed in claim 1, wherein the step of heat treating comprises heat treating under carburising conditions in a gaseous atmosphere containing carbon and is effected at a temperature in the range of 750° to 950° C. for 1 to 5 hours.

4. A method as claimed in claim 1, wherein the step of heat treating comprises heat treating under nitriding conditions in a gaseous atmosphere containing nitrogen and is effected at a pressure in the range of 20–150 KPa (0.2 to 1.5 bar), a temperature in the range of 500° to 900° C. and a time in the range of 1 to 10 hours.

5. A method as claimed in claim 1, wherein the step of heat treating comprises heat treating under carbonitriding conditions in a gaseous atmosphere containing carbon and nitrogen and is effected at a temperature in the range of 750° to 950° C. for 1 to 5 hours.

6. A method as claimed in claim 1, wherein the step of heat treating comprises heat treating under hydriding conditions in a gaseous atmosphere containing hydrogen and is effected at a pressure of at least 20 KPa (0.2 bar), a temperature in the range of 600° to 850° C. and a time in the range of 1 to 10 hours.

7. A method as claimed in claim 6, wherein the pressure is at least 30 KPa (0.3 bar).

8. A method as claimed in claim 6, wherein the pressure is 30 to 130 KPa (0.3 to 1.3 bar).

9. A method as claimed in claim 1, wherein the step of heat treating comprises heat treating under carbohydriding conditions in a gaseous atmosphere containing carbon and hydrogen and is effected at a temperature in the range of 750° to 950° C. for 1 to 5 hours.

* * * * *